Aug. 24, 1926.　　　　　　　　　　　　　　1,597,358
O. H. HANSEN
CAN FILLING MACHINE
Filed Jan. 28, 1918　　2 Sheets-Sheet 1
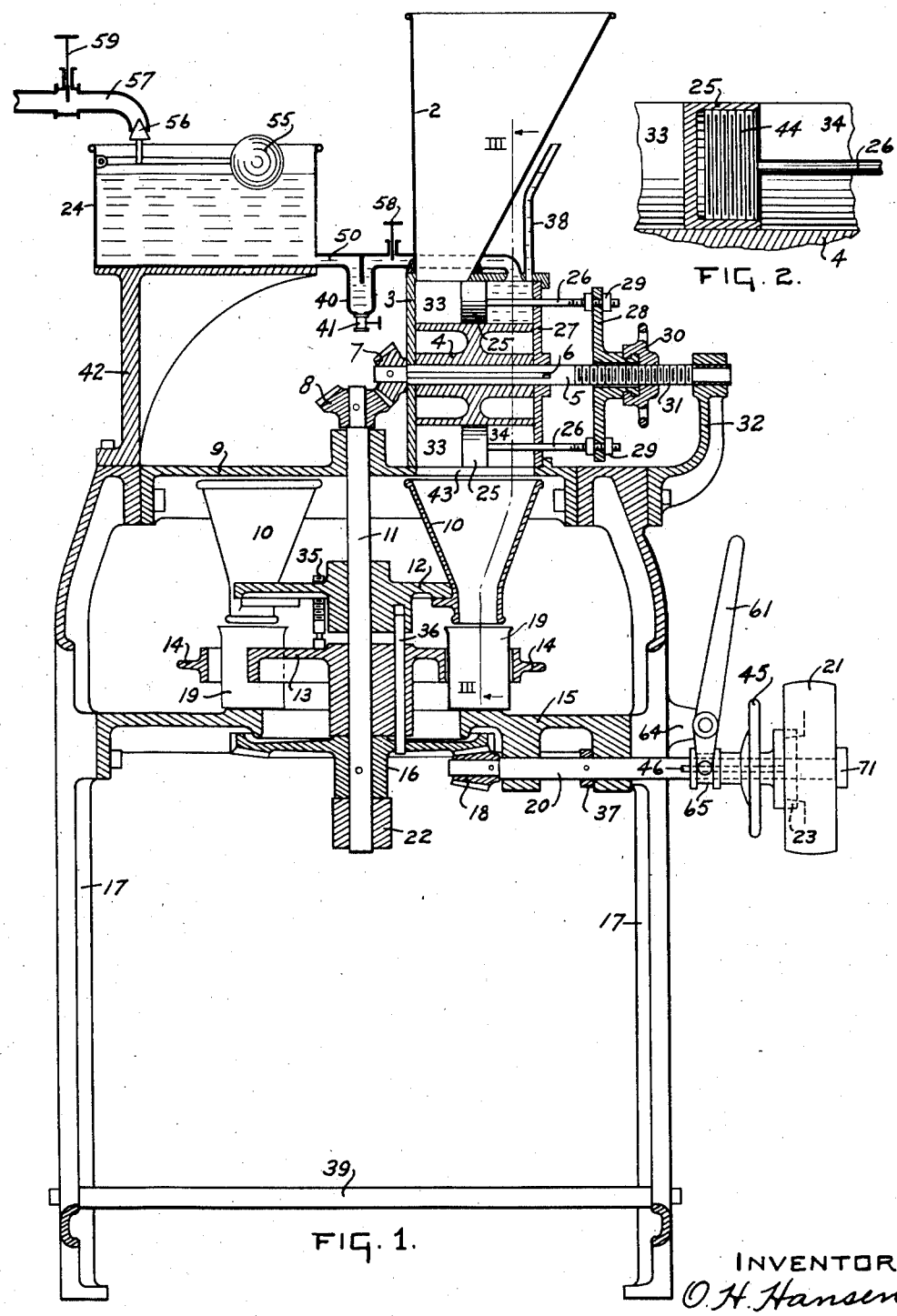
INVENTOR.
O. H. Hansen
BY W. H. Lieber
ATTORNEY.

Aug. 24, 1926.

O. H. HANSEN

CAN FILLING MACHINE

Filed Jan. 28, 1918

INVENTOR.
O. H. Hansen
BY W. H. Lieber
ATTORNEY.

Patented Aug. 24, 1926.

1,597,358

UNITED STATES PATENT OFFICE.

OSWALD H. HANSEN, OF PORT WASHINGTON, WISCONSIN, ASSIGNOR, BY DIRECT AND MESNE ASSIGNMENTS, TO HANSEN CANNING MACHINERY CORPORATION, A CORPORATION OF WISCONSIN.

CAN-FILLING MACHINE.

Application filed January 28, 1918. Serial No. 214,205.

This invention relates to improvements in the construction and operation of machines for feeding measured quantities of several kinds of material to receptacles, and has particular relation to improvements in machines for filling cans with liquid such as brine and granular material such as peas, beans, berries and the like.

An object of the invention is to provide a can filling machine which is simple and compact in construction and efficient in operation. Another object is to improve the operation of and to simplify the structure of can filling machines of the general type disclosed in Patent No. 1,188,764, granted June 27th, 1916. With the device disclosed in said patent, a predetermined quantity of one material is first measured after which just sufficient of the other material is mixed therewith to produce a predetermined quantity of mixture, this mixture of materials being delivered to the receptacle. With the present device, predetermined quantities of each kind of material are measured independently and are not mixed until after the measuring operations have been completed. The present invention also contemplates various detailed improvements which are generally applicable to machines of this type.

Some of the more specific objects of the present invention are as follows:—To produce a sanitary, compact and simple can filling machine of maximum capacity and minimum power consumption, which may be effectively manipulated by a single attendant. To provide a device for automatically, accurately and rapidly measuring the materials, and one in which waste of materials is entirely eliminated. To provide means for quickly varying the quantities of material measured and for automatically maintaining constant the sum of the quantities of material measured in complementary batches. To provide means for removing impurities from the liquid. To provide means for effectively and quickly changing grades whenever desirable. To provide power actuated means for positively feeding the receptacles to the machine without injury. To provide various other details of construction and operation which will reduce to a minimum the cost and increase to a maximum the efficiency of the machine.

While various specific terms are employed throughout this specification, it is not intended to limit the scope of the invention thereby. The term "can" as employed herein refers to any form of receptacle. The term "filling" refers to either a partial or complete filling of the receptacle. The term "peas" refers to any granular material or substance possessing characteristics similar to those of peas. The term "brine" refers to any liquid. The principles of the invention are applicable generally to machines for feeding measured quantities of several kinds of material to receptacles.

A clear conception of an embodiment of the invention may be had by referring to the drawings accompanying and forming a part of this specification, in which like reference characters designate the same or similar parts in the various views.

Fig. 1 is a central vertical section through a can filling machine, showing the general construction thereof.

Fig. 2 is an enlarged fragmentary sectional view through one of the measuring pockets and the adjustable dividing piston thereof.

Figure 3:
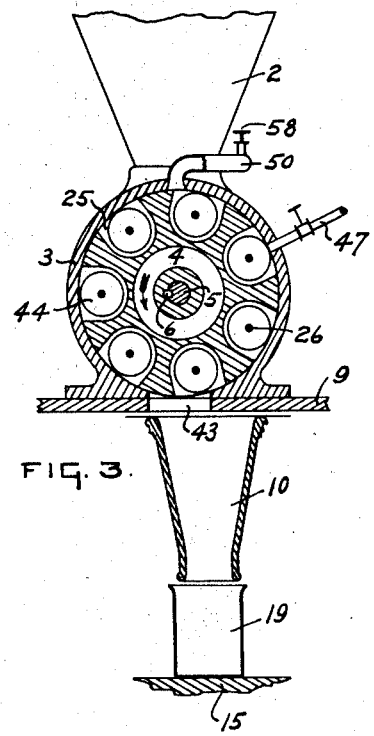
Fig. 3 is a fragmentary sectional view through the material measuring and feeding means, the section being taken along the line III—III of Fig. 1 looking in the direction of the arrows.

The stationary main frame of the can filling device comprises a pair of spaced vertical side frames 17 connected at their upper ends by means of a horizontal upper frame 9, at their medial portions by means of a horizontal can supporting frame 15, and at their lower portions by means of tie rods 39, see Fig. 1. The cylindrical measuring casing 3 is mounted upon the upper frame 9 above an elongated delivery opening 43 extending radially of the machine, see Figs.

1 and 3. Within the casing 3 is mounted a rotary measuring rotor 4 having a series of seven parallel longitudinal recesses in the periphery thereof forming the material measuring pockets. Within each of these recesses is located an adjustable partition or piston 25 which divides the recess into a pea measuring chamber 33 and a complementary brine measuring chamber 34. The pistons 25 are provided with adjustable cores 44 having screw thread coaction with the pistons as shown in Fig. 2. The parallel rods 26 extend through the brine measuring chambers 34 and a rotary end plate 27, and are adjustably secured to the adjusting disc 28 by means of clamping nuts 29. The rotor 4 and the end plate 27 are secured to the counter shaft 5 by means of a key 6, the shaft 5 being supported in bearings in the casing 3 and bracket 32. The adjusting disc 28 is adjustable along the shaft 5 by means of an adjusting hand wheel 30 having screw thread co-action with a thread 31 on the shaft 5, and having lugs engaging an annular recess in the hub of the disc 28.

The peas are supplied by gravity to the successive chambers 33 from the pea hopper 2 through an opening in the top of the casing 3. A suitable agitator of usual construction may be placed within the hopper 2 to prevent bridging of the peas over the discharge opening. The brine is supplied by gravity to the successive chambers 34 from the brine tank 24 through a brine pipe 50 communicating with an opening through the upper portion of the casing 3. The brine pipe 50 is provided with a brine control valve 58 and a trap 40 having a discharge gate 41. A vent pipe 38 communicating with the highest portion of the casing 3 rises to a point above the liquid level in the tank 24. The brine is supplied to the tank 24 through a brine pipe 57 having a hand controlled valve 59 for completely shutting off the brine supply, and a float controlled valve 56 controllable by a float 55 resting upon the brine in the tank 24 for maintaining a predetermined amount of brine in the tank. The brine tank is supported upon a bracket 42 mounted upon one of the side frame 17.

The horizontal counter shaft 5 has secured thereto a bevel pinion 7 which meshes with a bevel pinion 8 secured to the upper end of the vertical main shaft 11, see Fig. 1. The main shaft 11 is supported at its upper end in a central bearing formed on the upper frame 9, and at its lower extremity in a bearing 22 formed in a bracket 60 secured to the frame 15. The bevel gear 16 is secured to the main shaft 11 and rests upon the bearing 22. A can conveying element 13 having a series of seven radial can hooks, has a central bore engaging the shaft 11 and is drivingly connected to the gear 16 by means of a vertical rod 36. The annular series of seven funnels 10 mounted upon a funnel support 12 having a central bore engaging the shaft 11, is also drivingly connected to the bevel gear 16 by means of the vertical rod 36. The funnels 10 and funnel support 12 are vertically adjustable relatively to the conveying element 13 by means of one or more vertical jack screws 35 which engage screw threaded openings in the support 12 and which abut the element 13 at their lower ends. The cans 19 are urged along a horizontal plane upper surface of the supporting frame 15 by means of the element 13 and are guided in a circular course by means of the segmental can guide 14 which is also supported from the frame 15. The horizontal power counter shaft 20 is mounted in bearings formed integral with the element 9 and has a bevel pinion 18 secured to one end thereof meshing with the bevel gear 16, see Fig. 1. The shaft 20 has a thrust collar 37 thereon which engages one of the shaft bearings. The outer extremity of the shaft 20 is provided with a collar 71 engageable with an end of the hub of the driving pulley 21 which derives power from any suitable source. A friction or other type of clutch 23 controllable by means of a manually operable lever 61 having a stationary fulcrum 64, serves to form a driving connection between the pulley 21 and the shaft 20. The lower end of the lever 61 engages an annular recess 65 in the movable clutch element which is drivingly connected to the shaft 20 by a spline 46. The hand wheel 45 is fastened to the movable clutch element and serves as an alternative means for rotating the shaft 20 while changing grades.

Figure 4:
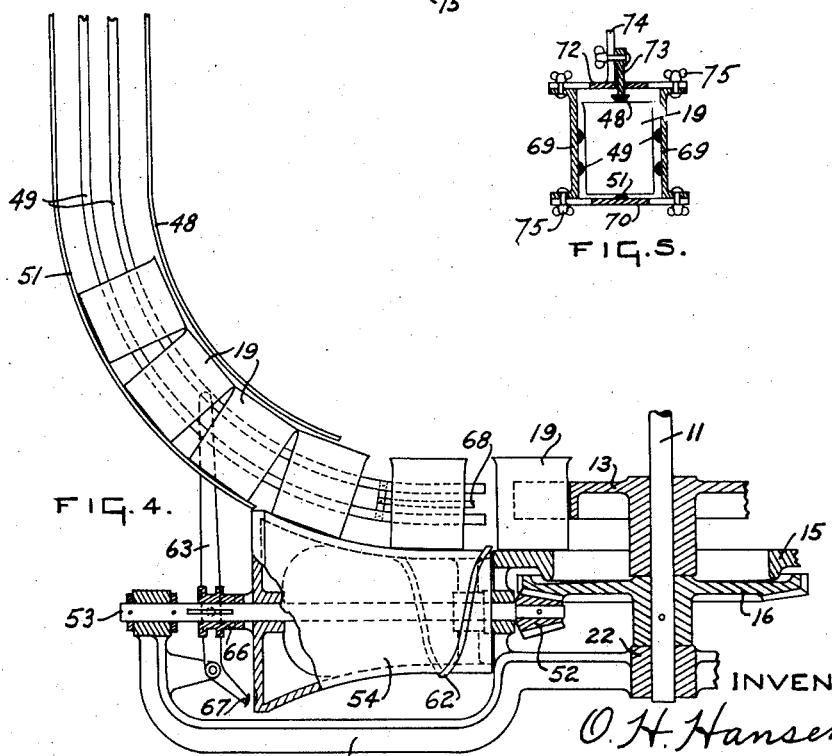
Fig. 4 is a part sectional elevation of the can feeding means which delivers the cans to the machine.

The cans 19 are delivered onto the horizontal plane supporting surface of the element 15 by means of a feed drum 54 having a cylindrical delivery portion provided with a helical projection 62 and having its opposite end tapered or of frusto conical shape, see Fig. 4. The can supporting and feeding drum 54 is mounted upon a counter shaft 53 supported in bearings in the bracket 60. The shaft 53 has a bevel pinion 52 secured to an end thereof which meshes with the main bevel gear 16. A jaw clutch 66 operable by means of a lever 63 serves to produce a driving connection between the shaft 53 and the drum 54. The lever 63 is provided with a brake element 67 which engages notches in the end of the drum 54 at the moment of disconnection of the clutch 65, and thus positively stops the drum 54.

Figure 5:
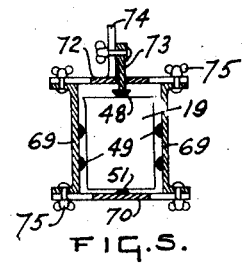
Fig. 5 is a transverse section through the can runway leading to the can feeding means.

The can runway leading to the drum 54 comprises a lower guide 51, an upper guide 48 and two pairs of side guides 49, see Figs. 4 and 5. The cans 19 are delivered down the vertical portion of the runway in horizontal position and are delivered upon the drum 54 in an inclined position as shown in Fig. 4. Leaf springs 68 secured to the side guides 49 on opposite sides of the runway resiliently engage and serve to retard the cans 19, keeping them in contact with the feeding projection 62. The guides 48, 49 are made up of short strips secured to adjustable elements 73, 69 respectively. The side elements 69 are adjustable inwardly by means of thumb screws 75 coacting in transverse slots in the top and bottom plates 72, 70 respectively. The element 73 is inwardly adjustable by means of thumb screws 75 coacting in transverse slots 74 formed on the plate 72. This arrangement provides means for adjusting the can runway for cans of various sizes.

Various other details of the can supplying and delivering mechanism are similar to those disclosed in Patent Number 1,460,-198, granted June 26, 1923, and need not be disclosed specifically herein.

During the normal operation of the machine, the operating lever 61 upon being moved in an anti-clockwise direction as viewed in Fig. 1, drivingly connects the power pulley 21 with the counter shaft 20 through the clutch 23. The rotation of the shaft 20 is transmitted through the pinion 18 and gear 16 to the elements 13, 12 and to the main shaft 11. The rotary motion of the shaft 11 is transmitted through the gears 8, 7 to the counter shaft 5 and rotor 4. The hopper 2 is then filled with peas and the brine tank supplied with brine by opening the valve 59. Upon opening the valve 58 in the pipe 50, brine flows through the trap and pipe 50 into the successive chambers 34 at the right of the pistons 25. As the brine flows into the chambers 34, the air is expelled from these chambers through the stand pipe 38, the brine rising in this pipe to the level of the liquid in the tank 24 as each succeeding chamber 34 comes into communication with the pipe 50. The successive chambers 33 at the left of the pistons 25 are filled with peas as these chambers are successively brought into communication with the discharge opening of the hopper 2. The chambers 33, 34 after being filled with peas and brine respectively, are advanced by the rotation of the rotor 4 and their contents are eventually discharged by gravity through the opening 43 and corresponding hoppers 10 and delivered to the cans 19. As the sum of the volumes of the complementary chambers 33, 34 less the volume of the voids in the peas in the chamber 33 is exactly equal to the volume of the portion of a can 19 which it is desired to fill, each can will receive exactly the proper amount of mixture. The phase relation between the moving measuring chambers 33, 34, the hoppers 10 and the cans 19 is such that corresponding chambers, hoppers and cans are in predetermined positions at the proper time, thereby insuring complete delivery of the measured quantities of material to the cans 19 and eliminating all waste of material. As the measuring pockets of the rotor 4 move away from the opening 43, they approach the sterilizing pipes 47 through which steam may be injected into the chambers 33, 34 to thoroughly cleanse the chambers whenever desired. The brine delivered from the tank 24 passes through the trap 40 in which sand and other impurities are separated. These accumulated impurities may be removed from time to time by opening the gate 41.

If it is desired to relatively vary the volumes of the chambers 33, 34 and to maintain constant the total volume of materials measured in complementary chambers, it is necessary only to move the pistons 25 in the proper direction relatively to the rotor 4 by manipulating the hand wheel 30. As the percentage of voids in any quantity of peas alone, is always substantially constant, any increase or decrease in the volume of voids in the measured quantities of peas due to adjustment of the pistons 25, is compensated for by the rods 26 which bear the same relation to the volumes of the liquid measuring chambers 34 as the voids bear to the actual volumes of the peas in the chambers 33. For instance if the volume of the voids among the peas filling a chamber 33 is 10 percent of the total volume of said chamber 33, the volume of the portion of the rod 26 within the complementary brine chamber 34 will also be 10 percent of that chamber. In this manner, the total actual volume of the materials measured in complementary chambers 33, 34 is automatically maintained constant irrespective of the position of adjustment of the corresponding piston 25.

If it is desired to vary the total volume of the material measured in complementary chambers 33, 34, this may be done by loosening the nuts 29 and turning each individual rod 26. This will cause the inner threaded portion of the piston 25 to move either toward or away from the outer portion thereby shortening or lengthening the piston and correspondingly varying the volumes of the chambers 33, 34. With this arrangement the total volume of the materials measured may be varied so that cans 19 of various sizes may be filled. This adjustment may also be utilized when it is desired to vary the volume of mixture deposited in cans 19 of the same size.

The empty cans 19 are delivered by gravity through the can runway and are delivered in inclined position upon the tapered portion of the rotating drum 54, see Fig. 4.

During normal operation of the machine, the lever 63 is thrown to the extreme right and the drum 54 is being rotated from the gear 16 through the pinion 52, shaft 53 and clutch 66. Due to the difference in peripheral velocity of successive portions of the conical drum 54, the successive cans 19 which are delivered to and rest by gravity upon the drum surface, are simultaneously urged forward and given rotatory motions about their own axes. As the successive cans 19 assume vertical positions they are caught by the helical projection 62 formed on the cylindrical portion of the drum 54 and are urged forward and around the advancing radial hooks of the element 13. The leaf springs 68 cooperating with the sides of the cans 19 frictionally retard the cans 19 and maintain them in engagement with the projection 62. The delivery of cans 19 to the machine may be quickly stopped by swinging the lever 63 to the left thereby disengaging the clutch 66 and simultaneously positively stopping the rotation of the drum 54 by applying the brake 67. The feed drum 54 entirely supports the passing cans 19 and has been found to operate satisfactorily even without the helical projection 62.

It is common practice in the art of canning peas, to interchangably pack different grades of peas. It is necesary in changing over from one grade to another, to entirely clear the machine of the preceding grade. This may be readily accomplished with the device of the present invention, by swinging the lever 61 to the extreme right and disconnecting the power when the last batch of peas in the hopper 2 is delivered into the adjacent chamber 33. The machine may then be operated manually by turning the hand wheel 45, until the peas have all been discharged from the chambers 33. A supply of the new grade of peas may then be placed in the hopper 2 when the machine is again ready for power operation. As the moving parts of the device are relatively light, manual operation of both the material measuring and can feed means is comparatively readily accomplished.

It will be noted that by simultaneously dropping the measured quantities of peas and brine from the chambers 33, 34 through the opening 43 and hoppers 10, directly into the underlying cans 19, no air can pocket in the voids between the peas as would be the case if the peas were first deposited in the cans 19 and the brine subsequently poured over them. Such pocketing of air is undesirable and may only be prevented by depositing the liquid or brine in the cans 19 at a time not later than the peas. By thus avoiding confinement of air in the voids, the cans 19 may be more rapidly filled and the existence of air in the finally sealed product is absolutely avoided, as it takes considerable time for such confined air to escape by a natural rise of the air bubbles through the mixture of peas and brine.

The fact that all moving elements are traveling continuously in the same direction, eliminates jarring and consequent splashing and waste of materials and permits operation at high speed. The various parts may be made readily accessible for inspection, cleaning and repairs and the entire operation of the machine may be effected by a single attendant. The various adjustments permit efficient setting of the parts to accurately supply like quantities of material to all cans. The can feeding mechanism insures proper delivery of the cans to the machine and entirely eliminates danger of injury to the cans.

It should be understood that it is not desired to be limited to the exact details of construction herein shown and described for various modifications may occur to persons skilled in the art.

It is claimed and desired to secure by Letters Patent:—

1. In a can filling machine, means for measuring successive quantities of liquid material, a series of pockets for independently measuring successive quantities of granular material while revolving about an axis, and means for simultaneously delivering one measured quantity of each material to each of a series of cans while in motion.

2. In a can filling machine, means for measuring successive quantities of liquid material, a series of pockets for independently measuring successive quantities of granular material while revolving about an axis, adjustable means for varying the quantities of each material measured, and means for simultaneously delivering one measured quantity of each material to each of a series of cans while revolving about an axis.

3. In a mechanism for feeding measured quantities of granular and liquid materials to receptacles, means continuously revoluble about an axis for independently measuring successive quantities of each material during said revolution, the sum of the volumes of one measured quantity of each material minus the volume of the voids in the measured quantity of granular material being equal to the portion of the receptacle to be filled, and means for delivering a mixture comprising a measured quantity of each material to each of a series of receptacles.

4. In a mechanism for feeding measured quantities of several kinds of material to receptacles, means for independently measuring a definite quantity of each kind of material, adjustable means for varying the quantities of each material measured, the sum of the volumes of the quantities measured being equal to the volume of the portion of the receptacle to be filled irrespective of the position of adjustment of said volume varying means, and means for delivering the measured quantities of material to a receptacle.

5. In a mechanism for measuring several materials, means for independently measuring definite quantities of liquid and granular material, and means for relatively varying the quantities measured, the sum of the volumes of the quantities measured for any position of adjustment of said varying means being constant.

6. In a machine for feeding equal quantities of mixture of granular and liquid material to successive receptacles, means for measuring a quantity of liquid material while said means revolves about an axis, means for independently measuring a quantity of granular material while said means revolves about an axis, the sum of the volumes of the measured quantities minus the volume of the voids in the quantity of granular material being equal to the volume of the portion of the receptacle to be filled, and means for mixing the measured quantities and for delivering the mixture to a receptacle while in motion.

7. In a mechanism for feeding equal quantities of mixture of granular and liquid materials to receptacles, means for measuring a quantity of liquid material, means for independently measuring a quantity of granular material, means for varying the volumes of the quantities measured, the sum of the volumes of the measured quantities minus the volume of the voids in the quantity of granular material being equal to the volume of the portion of the receptacle to be filled irrespective of the position of adjustment of said volume varying means, and means for mixing the measured quantities and for delivering the measured mixture to a receptacle.

8. In a can filling machine, a series of pockets for measuring successive quantities of liquid material while revolving about an axis, a series of pockets for independently measuring successive quantities of granular material while revolving about an axis, and means for mixing one measured quantity of each material and for delivering the successive batches of mixture to each of a series of cans while in motion.

9. In a can filling machine, means continuously revoluble about an axis to measure a definite quantity of granular material, means continuously revoluble about the same axis to independently measure a definite quantity of liquid material, the sum of the volumes of the measured quantities minus the volume of the voids in the quantity of granular material being equal to the volume of the portion of the receptacle to be filled, and means for simultaneously delivering the measured quantities of material in mixed condition to a can while in motion.

10. In a can filling machine, means revoluble about an axis to successively measure like quantities of granular material, means revoluble about an axis to independently measure like quantities of liquid material, and means for simultaneously dropping one measured quantity of each material into each of the successive cans of a series while said cans are in motion.

11. In a can filling machine, means revoluble about an axis to successively measure like quantities of granular material, means simultaneously revoluble about the same axis to independently measure like quantities of liquid material, and means for simultaneously dropping one measured quantity of each material into each of the successive cans of a series.

12. In a can filling machine, means for measuring successive quantities of liquid material while revolving about an axis, means for independently measuring successive quantities of granular material while revolving about an axis, adjustable means for varying the quantities of each material measured, and means for mixing one measured quantity of each material and for delivering the successive batches of mixture to each of a series of cans while in motion.

In testimony whereof, the signature of the inventor is affixed hereto.

OSWALD H. HANSEN.